(12) United States Patent
Seidl et al.

(10) Patent No.: US 10,199,968 B2
(45) Date of Patent: Feb. 5, 2019

(54) FAULT HANDLING FOR ALTERNATOR CONTROL DEVICES

(71) Applicant: Infineon Technologies AG, Neubiberg (DE)

(72) Inventors: Christoph Seidl, Graz (AT); Amir Hasanovic, Graz (AT); Sebastian Jandl, Pischelsdorf (AT); Karl Lamisch, Ragnitz (AT)

(73) Assignee: Infineon Technologies AG, Neubiberg (DE)

( * ) Notice: Subject to any disclaimer, the term of this patent is extended or adjusted under 35 U.S.C. 154(b) by 68 days.

(21) Appl. No.: 15/601,765

(22) Filed: May 22, 2017

(65) Prior Publication Data

US 2018/0337621 A1 Nov. 22, 2018

(51) Int. Cl.
*H02P 9/08* (2006.01)
*H02P 9/00* (2006.01)

(52) U.S. Cl.
CPC ............ *H02P 9/008* (2013.01); *H02P 9/08* (2013.01)

(58) Field of Classification Search
CPC .................................. H02P 9/008; H02P 9/08
See application file for complete search history.

(56) References Cited

U.S. PATENT DOCUMENTS

| 7,872,451 | B2 * | 1/2011 | Okuno | H02J 7/245 318/449 |
| 2006/0006845 | A1 * | 1/2006 | Aoyama | H02P 9/10 322/22 |
| 2007/0085510 | A1 * | 4/2007 | Asada | H02P 9/02 322/28 |
| 2007/0114976 | A1 * | 5/2007 | Inokuchi | H02J 7/1461 322/28 |
| 2008/0088282 | A1 * | 4/2008 | Inokuchi | H02P 9/107 322/28 |
| 2008/0224671 | A1 * | 9/2008 | Kimura | H02P 9/102 322/19 |
| 2009/0146617 | A1 * | 6/2009 | Yoshida | H02K 11/20 322/99 |

(Continued)

OTHER PUBLICATIONS

"TLE8880, Alternator Regulator with LIN Interface," Product Brief, Infineon, accessed from www.infineon.com/alternator, Dec. 2013, 2 pp.

*Primary Examiner* — Viet Nguyen
(74) *Attorney, Agent, or Firm* — Shumaker & Sieffert, P.A.

(57) ABSTRACT

In some examples, an alternator control device includes interface configured to receive a voltage signal from an engine control device, pull-down circuitry, and a switch electrically connected between the interface and the pull-down circuitry. The alternator control device further includes processing circuitry configured to determine that the voltage signal is higher than a threshold voltage level and to activate the switch to electrically connect the interface to the pull-down circuitry in response to determining that the voltage signal is higher than the threshold voltage level. The processing circuitry is further configured to determine that, at least a threshold time duration after activating the switch, the voltage signal is higher than the threshold voltage level and to refrain from delivering the excitation current based on determining that, at least the threshold time duration after activating the switch, the voltage signal is higher than a threshold voltage level.

20 Claims, 7 Drawing Sheets

(56) References Cited

U.S. PATENT DOCUMENTS

| | | | |
|---|---|---|---|
| 2010/0060245 A1* | 3/2010 | Namuduri | H02M 7/219 |
| | | | 322/89 |
| 2014/0055102 A1* | 2/2014 | Gibson | B60L 1/003 |
| | | | 322/7 |
| 2014/0055894 A1* | 2/2014 | Maruyama | H02H 9/04 |
| | | | 361/56 |
| 2014/0368171 A1* | 12/2014 | Maehara | H02P 9/107 |
| | | | 322/59 |
| 2016/0365813 A1* | 12/2016 | Graefling | H02P 9/006 |
| 2016/0380567 A1* | 12/2016 | Grafling | H02P 9/006 |
| | | | 322/28 |
| 2017/0346431 A1* | 11/2017 | Auer | H02P 9/10 |

* cited by examiner

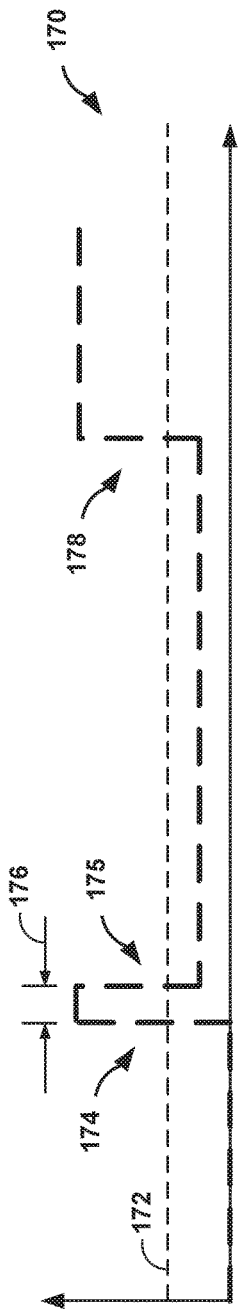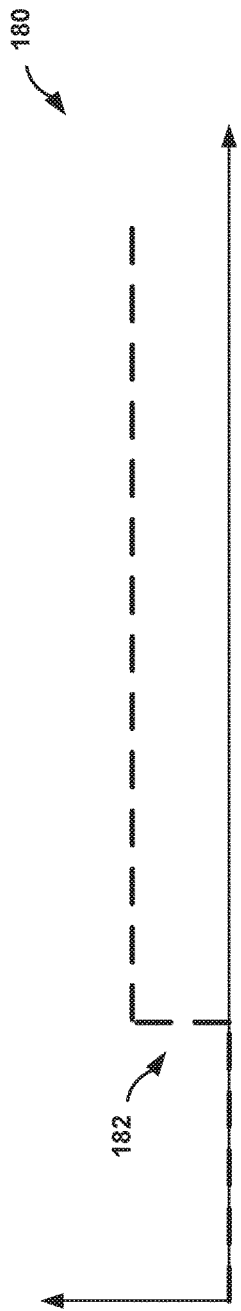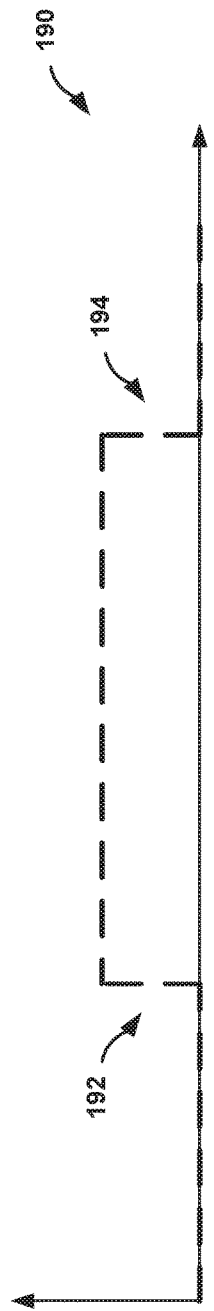

FAULT HANDLING FOR ALTERNATOR CONTROL DEVICES

TECHNICAL FIELD

This disclosure relates to alternator control devices.

BACKGROUND

An alternator is a machine that generates an electrical signal from mechanical energy. The alternator may receive the mechanical energy in the form of a spinning shaft known as a rotor. The rotor may create a magnetic field that causes an electrical current to flow in a stationary portion of the alternator known as a stator. There are two main ways for a rotor to create a magnetic field to drive an electrical current in the stator. First, the rotor may contain a permanent magnet that creates a magnetic field that rotates with the rotor. Alternators that use a permanent magnet may be known as magnetos. Second, the rotor may create a magnetic field by having electric current pass through windings inside the rotor. The electric current passing through windings inside the rotor may be called an excitation current. In some examples, an alternator may include at least one permanent magnet and at least one excitation coil.

An alternator control device may be configured to control the excitation current traveling through the windings inside the rotor. In some examples, the alternator control device may be communicatively coupled to an engine control device that is configured to control an internal combustion engine that generates mechanical power for the alternator. The engine control device may transmit a voltage signal to the alternator control device, where the alternator control device controls the excitation current based on the voltage signal from the engine control device.

SUMMARY

This disclosure describes techniques for detecting an erroneous voltage signal from an engine control device to an alternator control device. The erroneous voltage signal may include a voltage level that is higher than a threshold voltage level. The alternator control device may determine that the voltage signal is erroneous by determining that the voltage signal is higher than the threshold voltage level for at least a threshold time duration. Based on determining that the voltage signal is erroneous, the alternator control device is configured to prevent an excitation current from being delivered to the alternator.

In some examples, an alternator control device is configured to control delivery of an excitation current to an alternator, and the alternator control device includes an interface configured to receive a voltage signal from an engine control device, pull-down circuitry, and a switch electrically connected between the interface and the pull-down circuitry. The alternator control device further includes processing circuitry configured to determine that the voltage signal is higher than a threshold voltage level and to activate the switch to electrically connect the interface to the pull-down circuitry in response to determining that the voltage signal is higher than the threshold voltage level. The processing circuitry is further configured to determine that, at least a threshold time duration after activating the switch, the voltage signal is higher than the threshold voltage level and to refrain from delivering the excitation current to the alternator based on determining that, at least the threshold time duration after activating the switch, the voltage signal is higher than a threshold voltage level.

In some examples, a method for controlling delivery of an excitation current to an alternator, the method including receiving, by an interface, a voltage signal from an engine control device and determining that the voltage signal is higher than a threshold voltage level. The method further includes activating a switch to electrically connect the interface to pull-down circuitry in response to determining that the voltage signal is higher than the threshold voltage level. The method also includes determining that, at least a threshold time duration after activating the switch, the voltage signal is higher than the threshold voltage level. The method includes refraining from delivering the excitation current to the alternator based on determining that, at least the threshold time duration after activating the switch, the voltage signal is higher than the threshold voltage level.

In some examples, an alternator for a vehicle including a rotor includes one or more rotor coils, a stator including one or more stator coils, and an alternator control device configured to control an excitation current delivered to the one or more rotor coils, wherein the alternator control device includes a pin configured to receive a voltage signal from the engine control device. The alternator control device further includes pull-down circuitry, a switch electrically connected between the pin and the pull-down circuitry, and processing circuitry configured to determine that the voltage signal is higher than a threshold voltage level. The processing circuitry is further configured to activate the switch to electrically connect the pin to the pull-down circuitry in response to determining that the voltage signal is higher than the threshold voltage level. The processing circuitry is further configured to determine that, at least a threshold time duration after activating the switch, the voltage signal is higher than the threshold voltage level and to refrain from delivering the excitation current to the one or more rotor coils based on determining that, at least the threshold time duration after activating the switch, the voltage signal is higher than the threshold voltage level.

The details of one or more examples are set forth in the accompanying drawings and the description below. Other features, objects, and advantages will be apparent from the description and drawings, and from the claims.

BRIEF DESCRIPTION OF DRAWINGS

FIGS. 6A-6C are timing diagrams for the alternator control device and the engine control device of FIGS. 1, 3, and 4, in accordance with some examples of this disclosure.

DETAILED DESCRIPTION

Figure 1:
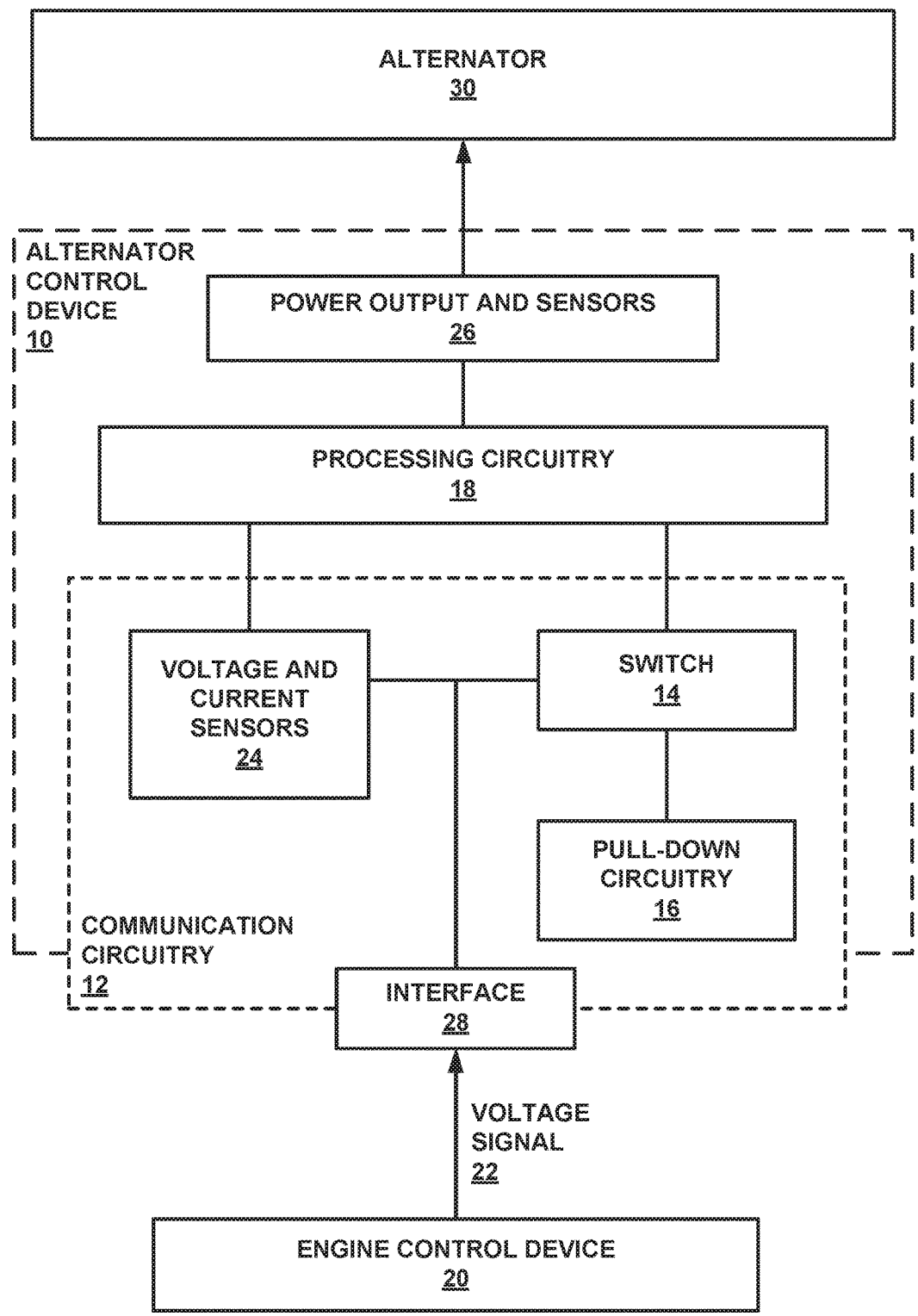
FIG. 1 is a conceptual block diagram of a system including an alternator control device, in accordance with some examples of this disclosure.

An alternator control device may control the operation of an alternator based on a voltage signal received by the alternator control device from an engine control device. In some examples, the voltage signal may be pulled high or low by an inadvertent short circuit to a voltage source. The inadvertent short circuit may override, block, or prevent the transmission of actual command signals from the engine control device to the alternator control device.

When the alternator control device receives a high voltage signal from the engine control device, the alternator control device may attempt to pull down the voltage signal to communicate to the engine control device that the alternator control device is in a certain state of control or to indicate an error condition in the alternator control device. If the voltage signal is being pulled up by a short circuit with sufficiently low impedance, the alternator control device may not be able to pull down the voltage signal. The alternator control device may interpret the shorted voltage signal as a command signal to deliver an excitation current to the alternator. In some examples, an erroneous command signal may cause the delivery of an unwanted excitation current, which may drain a battery that supplies the excitation current.

An alternator control device may detect the erroneous voltage signal by determining that the voltage signal is still high, even after a threshold time duration has passed since a switch was activated to pull down the voltage signal. The alternator control device may determine that a voltage signal is high by comparing the voltage signal to a threshold voltage level. In response to detecting an erroneous voltage signal, the alternator control device may refrain from delivering an excitation current to the alternator. In some examples, the alternator control device may be further configured to determine whether the speed of the alternator is greater than or less than a threshold speed, such as a self-start speed. The alternator control device may be further configured to deliver the excitation current in response to determining that the speed of the alternator is greater than the threshold speed. If the speed of the alternator is less than the threshold speed, the alternator control device may be configured to refrain from delivering an excitation current.

By refraining from delivering the excitation current, the alternator control device may conserve the electrical charge stored in a battery. For example, if the alternator is in a vehicle, the alternator control device may receive an erroneous high voltage signal when an engine in the vehicle is not running, and therefore the alternator may not be running. In some examples, the erroneous high voltage signal may be caused by a short circuit on or in the engine control device between a battery terminal and a communication terminal configured to deliver command signals to the alternator control device. If the alternator control device responds to the erroneous high voltage signal by causing power conversion circuitry to deliver an excitation current to the alternator, the battery charge may be depleted. In some examples, the excitation current may drain a relatively large electrical current, such as one ampere, from the battery, such that the battery is depleted before the engine begins running again. In contrast, if the alternator control device refrains from delivering the excitation current, the alternator control device may consume a relatively small electrical current, such as twenty milliamperes, such that the battery maintains a sufficient electrical charge to start the engine in the future.

FIG. 1 is a conceptual block diagram of a system 2 including an alternator control device 10, in accordance with some examples of this disclosure. System 2 includes alternator control device 10, engine control device 20, and alternator 30. In some examples, system 2 may include an engine, where engine control device 20 is configured to control the operation of the engine. In some examples, system 2 may also include a vehicle such as an automobile, an aircraft, and/or a marine vehicle. Alternator control device 10 includes communication circuitry 12, switch 14, pull-down circuitry 16, processing circuitry 18, voltage and current sensors 24, power output and sensors 26, and interface 28. In some examples, alternator control device 10 may also include power supply circuitry and/or reference voltage circuitry. Alternator control device 10 is configured to control the operation of alternator 30 by at least controlling the delivery of an excitation current to alternator 30.

Alternator control device 10 may control the operation of alternator 30 by, for example, controlling and regulating the flow of an excitation current to alternator 30. Alternator control device 10 may be configured to control the electrical output of alternator 30 by controlling the excitation current. Alternator control device 10 may be configured to monitor the electrical output of alternator 30, which may include one or more phases. In some examples, alternator control device 10 may be configured to monitor one or more phases of the electrical output of alternator 30 to detect the speed of alternator 30. Alternator control device 10 may be configured to monitor an electrical bus, such as a battery line, as an input for the regulation of alternator 30.

Communication circuitry 12, by interface 28, is configured to receive voltage signal 22 from engine control device 20. Communication circuitry 12 may include electrical components for receiving and storing voltage signal 22. In some examples, communication circuitry 12 and interface 28 may include one or more pins that conduct electricity from a wire that is outside of alternator control device 10 to circuitry inside of alternator control device 10. In some examples, communication circuitry 12 and interface 28 may also include a conductive pad, a leadframe segment, a bond wire, a conductive ribbon, and/or any other suitable components. In the example depicted in FIG. 1, communication circuitry 12 includes switch 14, pull-down circuitry 16, voltage and current sensors 24, and interface 28.

Switch 14 is electrically connected between interface 28 and pull-down circuitry 16. When switch 14 is closed or activated, communication circuitry 12 may be configured to pull down the voltage at interface 28. When switch 14 is open or de-activated, interface 28 may be electrically disconnected from pull-down circuitry 16. Processing circuitry 18 may deliver control signals to switch 14 to activate or de-activate switch 14. Switch 14 may include one or more voltage-controlled elements such as transistors, thyristors, and/or any other switch for selectively allowing the flow of electricity between interface 28 and pull-down circuitry 16.

Pull-down circuitry 16 may be configured to pull down the voltage at interface 28. Pull-down circuitry 16 may include one or more resistors and/or capacitors electrically connected between switch 14 and reference voltage circuitry (not shown in FIG. 1). When switch 14 is activated, electricity may flow from interface 28 through switch 14 and pull-down circuitry 16 to a voltage sink such as reference voltage circuitry. Thus, pull-down circuitry 16 may drain the electrical charge at interface 28.

Processing circuitry 18 is configured to determine that voltage signal 22 is higher than a threshold voltage level. Processing circuitry 18 may include a comparator configured to compare the voltage level at interface 28 to the threshold voltage level and generate an output based on whether voltage signal 22 is higher or lower than the threshold voltage level. Processing circuitry 18 may be configured to determine when a voltage level of voltage signal 22 is higher than the threshold voltage level, even in a low-power mode. In some examples, processing circuitry 18 may be configured to wake alternator control device 10 from the low-power mode based on determining that voltage signal 22 is higher than the threshold voltage level.

Processing circuitry 18 may be configured to receive voltage signal 22 from communication circuitry 12, which may include one or more comparators and current sensors (e.g., voltage and current sensors 24). In low-power mode, communication circuitry 12 may detect and transmit a wake signal to processing circuitry 18, which may be configured to execute the wakeup. Processing circuitry 18 may be configured to control switch 14 to connect interface 28 to pull-down circuitry 16. In some examples, switch 14, pull-down circuitry 16, and interface 28 may be parts of communication circuitry 12.

Processing circuitry 18 is configured to activate switch 14 to electrically connect interface 28 to pull-down circuitry 16 in response to determining that voltage signal 22 is higher than the threshold voltage level. Processing circuitry 18 may be configured to deliver a control signal to switch 14 to cause switch 14 to conduct electricity between interface 28 and pull-down circuitry 16. When switch 14 is activated, pull-down circuitry 16 may drain the electrical charge of voltage signal 22 from interface 28.

Processing circuitry 18 may be configured to activate switch 14 to deliver state information or an error condition to engine control device 20. In some examples, alternator control device 10 may also include a protection circuit to disable switch 14 if a short to battery is present in alternator control device 10. Processing circuitry 18 may be configured to use the short detection information to block a state transition from an initial state to a pre-excitation state and therefore to refrain from delivering an excitation current to alternator 30 if the speed of alternator 30 is below a threshold speed.

Processing circuitry 18 is further configured to determine that, at least a threshold time duration after activating switch 14, voltage signal 22 is higher than the threshold voltage level. If voltage signal 22 has a high voltage level because of a short circuit at engine control device 20, pull-down circuitry 16 may be unable to pull down the voltage level of voltage signal 22 below the threshold voltage level. Processing circuitry 18 may be configured to wait at least a threshold time duration and determine if voltage signal 22 is still higher than the threshold voltage level. Processing circuitry 18 may be configured to set a timer when switch 14 is activated and compare the voltage at interface 28 to the threshold voltage level at or after the timer reaches the threshold time duration.

Processing circuitry 18 is configured to refrain from delivering the excitation current to alternator 30 based on determining that, at least the threshold time duration after activating switch 14, voltage signal 22 is higher than the threshold voltage level. In response to this determination, processing circuitry 18 may be configured to refrain from delivering control signals to power conversion circuitry that is configured to deliver the excitation current to alternator 30. In some examples, processing circuitry 18 may be configured to refrain from delivering the excitation current only if the speed of alternator 30 is less than a threshold speed, such as a self-start speed. In some examples, processing circuitry 18 may be configured to deliver or refrain from delivering an excitation current to alternator 30 by delivering or refraining from delivering control signals to power output and sensors 26. Power output and sensors 26 may be configured to deliver the excitation current to alternator 30.

Engine control device 20 may be configured to control the operation of an engine of system 2. In some examples, engine control device 20 may also be configured to control the operation of alternator control device 10 by transmitting voltage signal 22 to communication circuitry 12. Switch 14 may be configured to connect interface 28 to pull-down circuitry 16 to transmit a signal back to engine control device 20 indicating the control state of processing circuitry 18.

Voltage signal 22 may be a binary signal with a high value and a low value that is transmitted between engine control device 20 and alternator control device 10. Voltage signal 22 may include a pulse-density modulated signal such as a pulse-width modulated (PWM) signal. In some examples, engine control device 20 may transmit command signals to alternator control device 10, and alternator control device 10 may transmit diagnostic signals to engine control device 20. Engine control device 20 may transmit a command signal to alternator control device 10 to deliver an excitation current by pulling up voltage signal 22. In some examples, engine control device 20 may transmit a command signal by pulling down voltage signal 22.

Voltage and current sensors 24 of communication circuitry 12 may include one or more comparators configured to determine if a voltage and/or current exceeds a threshold value and/or is lower than a threshold value. In some examples, a comparator of voltage and current sensors 24 may be configured to sense a voltage level of voltage signal 22. The comparator may be configured to compare voltage signal 22 to a threshold voltage level and transmit an output signal to processing circuitry 18.

Power output and sensors 26 may be configured to deliver an excitation current to alternator 30. Power output and sensors 26 may be configured to receive a control signal from processing circuitry 18 and generate the excitation current based on the control signal. Power output and sensors 26 may be configured to monitor the speed of alternator 30 and transmit a signal indicating the speed of alternator 30 to processing circuitry 18.

The techniques of this disclosure also apply to scenarios in which the active value of voltage signal 22 is a lower voltage, and the inactive value of voltage signal 22 is a higher voltage. In this example, pull-down circuitry 16 may be configured to pull up voltage signal 22, and processing circuitry 18 may be configured to determine that voltage signal 22 is lower than a threshold voltage level.

Alternator 30 may convert mechanical energy into electrical energy for system 2. In some examples, alternator 30 may be a dynamo, a magneto, or a generator. Alternator 30 may receive mechanical energy from an engine in the form of a rotating shaft such as a crankshaft. In some examples, alternator 30 may output electrical energy to a rechargeable power source and/or to electrical loads. During operation of the engine, alternator 30 may convert mechanical energy from the engine into electrical energy to recharge the battery. The engine may control the speed of the alternator through the angular velocity of the rotating shaft, via a pulley and/or belt. The engine may be an internal combustion engine, a hybrid combustion-electric engine, or any other suitable engine.

Alternator 30 may include a rotor and a stator, where the rotor includes rotor coils for receiving the excitation current. As the excitation current travels through the rotor coils, the excitation current may create an electromagnetic field that induces current in the stator coils in the stator of alternator 30. Alternator 30 may output an electrical current from the stator coils to a rechargeable battery or an electrical load.

In accordance with the techniques of this disclosure, processing circuitry 18 may be configured to detect an erroneous voltage level of voltage signal 22. Processing circuitry 18 may be configured to activate switch 14 to pull down voltage signal 22. Processing circuitry 18 may be configured to check if voltage signal 22 is still above the threshold voltage level at or after a threshold time duration since activating switch 14. If voltage signal 22 is still above the threshold voltage level after the threshold time duration, processing circuitry 18 may refrain from causing the delivery of an excitation current to alternator 30. As a result, alternator control device 10 may avoid draining the charge stored in a battery. In some examples, processing circuitry 18 may be configured to refrain from causing the delivery of the excitation current only if the speed of alternator 30 is less than a threshold speed, such as a self-start speed.

Figure 2:
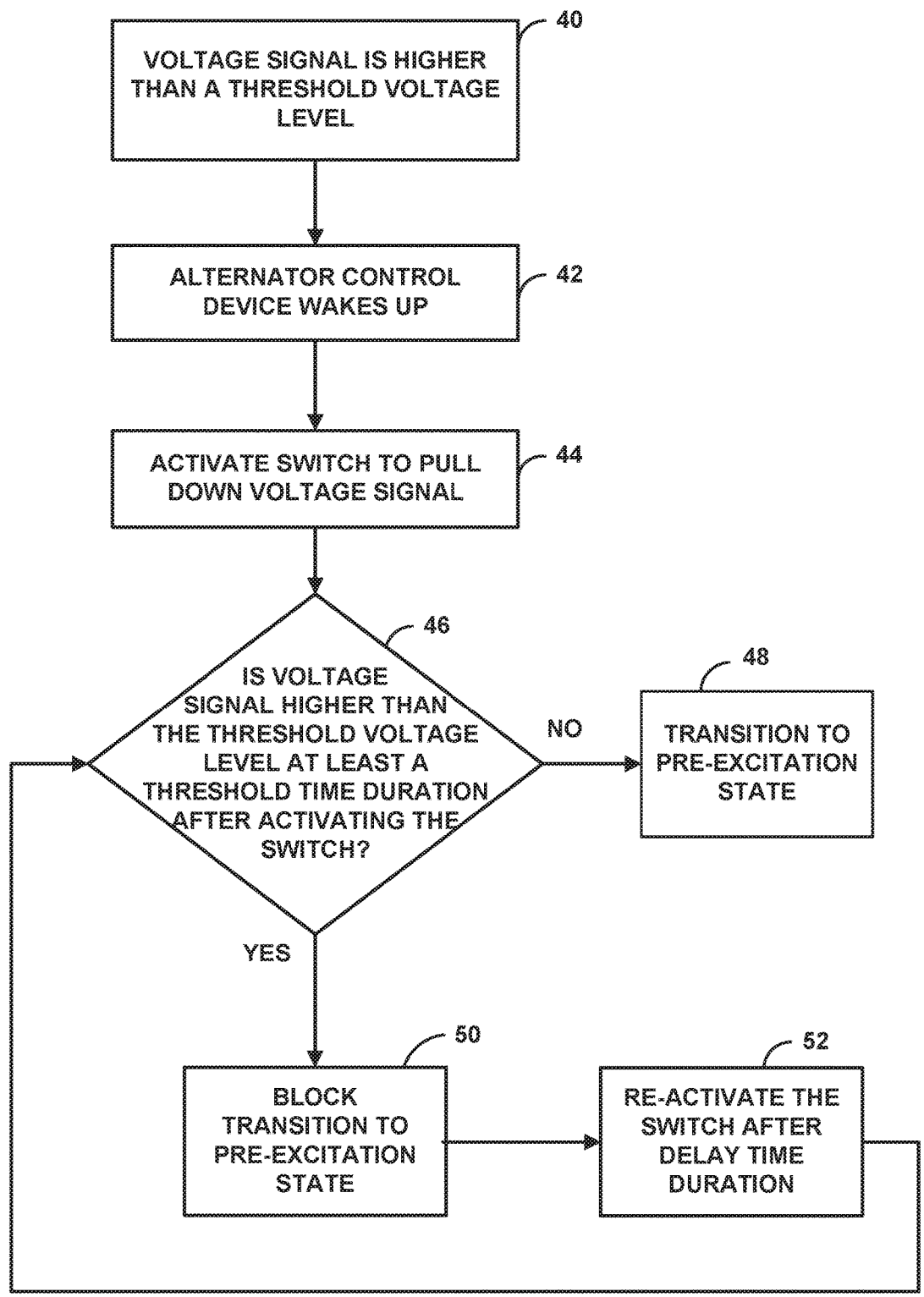
FIG. 2 is a flow diagram illustrating the operation of the alternator control device of FIG. 1, in accordance with some examples of this disclosure.

FIG. 2 is a flow diagram illustrating the operation of alternator control device 10, in accordance with some examples of this disclosure. The technique of FIG. 2 is described with reference to alternator control device 10 and processing circuitry 18 in FIG. 1, although other components, such as alternator control device 10 in FIGS. 3 and 4 and the state diagram in FIG. 5, may exemplify similar techniques.

The technique of FIG. 2 includes determining if voltage signal 22 is higher than the threshold voltage level (40). Processing circuitry 18 may be configured to detect the output of a comparator that receives the voltage level at interface 28 and the threshold voltage level as inputs. If voltage signal 22 is higher than the threshold voltage level, the technique of FIG. 2 further includes waking up alternator control device 10 (42). Alternator control device 10 may be in a low-power mode before processing circuitry 18 determines that voltage signal 22 is higher than the threshold voltage level.

After waking up alternator control device 10, the technique of FIG. 2 also includes activating switch 14 to pull down voltage signal 22 (44). When activated, switch 14 may conduct electricity between interface 28 and pull-down circuitry 16. At least a threshold time duration after activating switch 14, the technique of FIG. 2 includes determining if voltage signal 22 is higher than the threshold voltage level (46). In some examples, the threshold time duration may be greater than twenty microseconds and less than one hundred microseconds, such as fifty microseconds. If processing circuitry 18 determines that voltage signal 22 has been pulled below the threshold voltage level, the technique of FIG. 2 includes transitioning to a pre-excitation state (48). Processing circuitry 18 may be configured to include a state machine with a pre-excitation state, in which processing circuitry 18 delivers, or causes the delivery of, an excitation current to alternator 30.

If processing circuitry 18 determines that voltage signal 22 is still higher than the threshold voltage level, the technique of FIG. 2 includes blocking the transition to the pre-excitation state (50). Therefore, processing circuitry 18 may be configured to de-activate switch 14 and remain in an initial state in which processing circuitry 18 is not configured to deliver the excitation current. After a delay time duration, the technique of FIG. 2 includes re-activating switch 14 to attempt to pull down voltage signal 22 again (52). By waiting the delay time duration, processing circuitry 18 may conserve energy while also checking for a command signal from engine control device 20 that can be pulled down. A command signal that can be pulled down may indicate that the short circuit has been removed. The delay time duration may be greater than ten milliseconds and less than one hundred milliseconds, such as thirty-six milliseconds.

At least the threshold time duration after re-activating switch 14, processing circuitry 18 may be configured to determine that if voltage signal 22 is higher than the threshold voltage level. Processing circuitry 18 may be configured to refrain again from delivering the excitation current to alternator 30 based on determining that, at least the threshold time duration after re-activating switch 14, voltage signal 22 is higher than the threshold voltage level.

Figure 3:
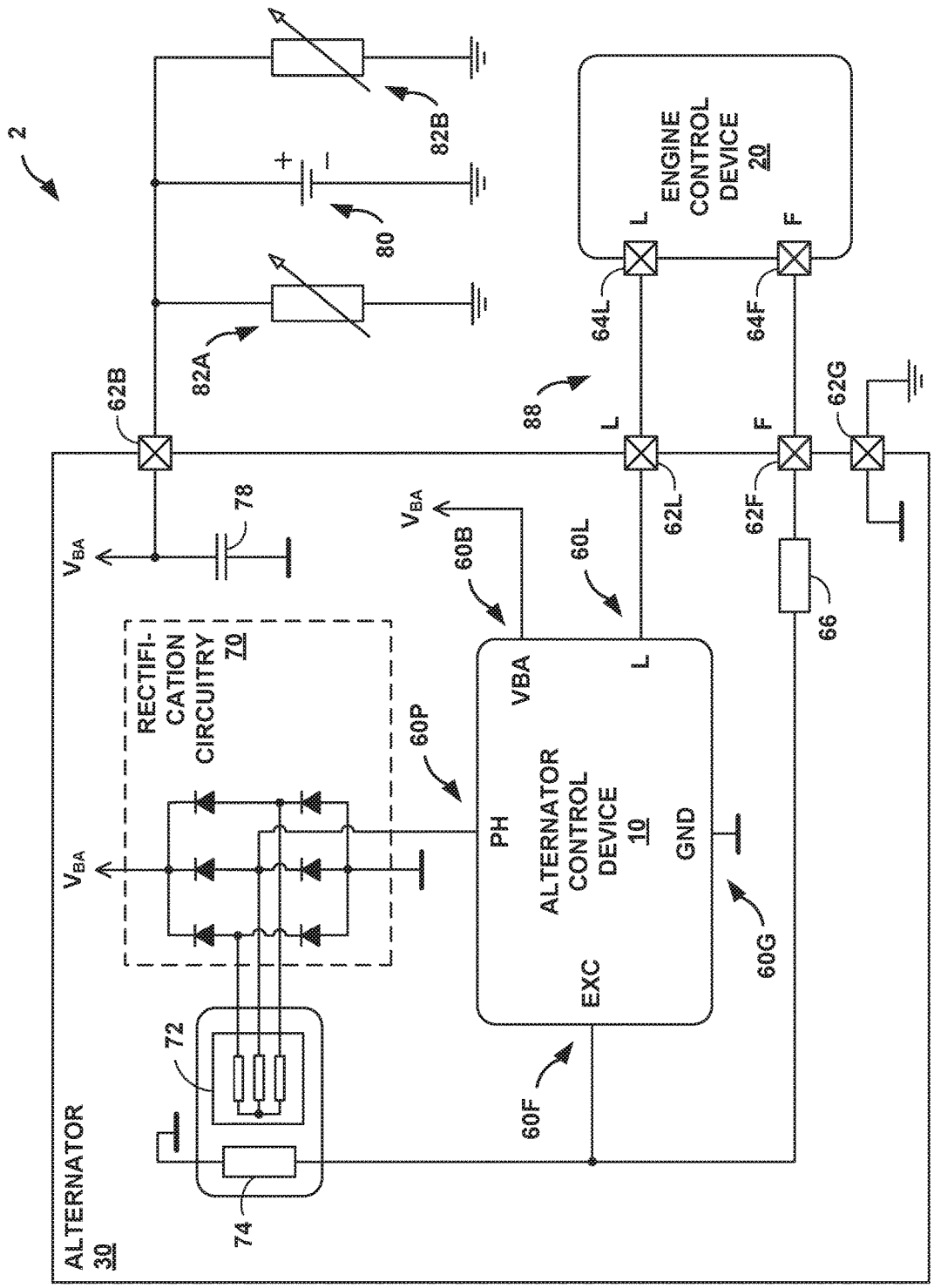
FIG. 3 is a conceptual block and circuit diagram of the system of FIG. 1, in accordance with some examples of this disclosure.

FIG. 3 is a conceptual block and circuit diagram of system 2, in accordance with some examples of this disclosure. System 2 includes alternator control device 10, engine control device 20, alternator 30, and power supply 80. Alternator control device 10 is depicted as including five input/output (I/O) nodes, engine control device 20 is depicted as including two I/O nodes, and alternator 30 is depicted as including four I/O nodes, but each component may include more or fewer I/O nodes.

Alternator control device 10 may include I/O nodes, such as a communication (L) node 60 configured to transmit and receive signals with engine control device 20. L node 60 may be a part of interface 28 in communication circuitry 12 and may include a pin with conductive material for conducting electricity between circuitry inside alternator control device 10 and a wire outside of alternator control device 10. L node 60 may be electrically connected to L node 62L of alternator 30 and L node 64L of engine control device 20 through wire 88.

Alternator control device 10 may also include excitation node 60F, phase node 60P, battery node 60B, and ground node 60G. Each of the nodes may include a pin. Through excitation node 60F, alternator control device 10 may regulate an output voltage of alternator 30 by varying an electrical signal known as an excitation current. Alternator control device 10 may use a pulse-width modulated ("PWM") controlled voltage signal to vary the excitation current. Excitation node 60F may be connected to one or more rotor coils in rotor 74 so that the excitation current travels through rotor 74. The rotor coils may include a resistance that is on the order of one ohm. In some examples, rotor 74 may include permanent magnets in addition to rotor coils. Engine control device 20 may also be configured to control the delivery of the excitation current through excitation nodes 64F and 62F, wire 88, and passive element 66, which may be a ten-kiloohm resistor.

Ground node 60G may be electrically connected to a reference voltage within system 2, where the reference voltage may be a reference ground voltage. In some examples, the reference voltage may correspond to the potential of a vehicle chassis or the potential of some other suitable material in system 2 that acts as an electrical source or sink. Alternator 30 may be connected to the reference ground via ground node 60G. The term "reference ground" and "reference voltage" generally refer to any known reference voltage or potential, and do not necessarily correspond to any specific voltage level.

Phase node 60P may be electrically connected to two or more of the phases of stator coils 72. Alternator control device 10 may monitor one or more phases of stator coils 72 via phase node 60P. Alternator control device 10 may be configured to monitor the phase(s) in order to determine the speed of alternator 30. In some examples, phase node 60P may be connected directly to stator coils 72, which may include three phases. Stator coils 72 may conduct current to rectification circuitry 70 based on a rotating magnetic field produced by rotor 74. Stator coils 72 may deliver an AC signal with one or more phases to rectifier bridge 12, which may convert the AC signal to a DC signal.

Battery node 60B may be electrically connected to power supply 80 through battery node 62B. Alternator control device 10 may measure the voltage at battery node 60B and adjust the excitation current that alternator control device 10 delivers to rotor 74 via excitation node 60F. Thus, alternator control device 10 may form a closed loop feedback network, whereby alternator control device 10 regulates the voltage on battery node 60B at a precise value by adjusting the excitation current.

Power supply 80 may comprise a rechargeable battery that can supply electrical power to electrical 82A and 82B. Power supply 80 may be configured to receive electrical power from alternator 30 to replenish the energy storage of power supply 80. Electrical loads 82A and 82B may include any subsystems within system 2 that consume electrical energy. In some examples where system 2 is an automobile, electrical loads 82A and 82B may include heating and cooling, radio and video displays, steering assistance, power windows, and other subsystems. Alternator 30 may produce an AC electrical signal and convert the AC signal, using rectification circuitry 70, to a direct current ("DC") signal to deliver to power supply 80 and electrical loads 82A and 82B. Capacitor 78 may smooth the DC signal as the DC signal travels through battery node 62B to recharge power supply 80 and/or deliver electricity to electrical loads 82A and 82B.

Figure 4:
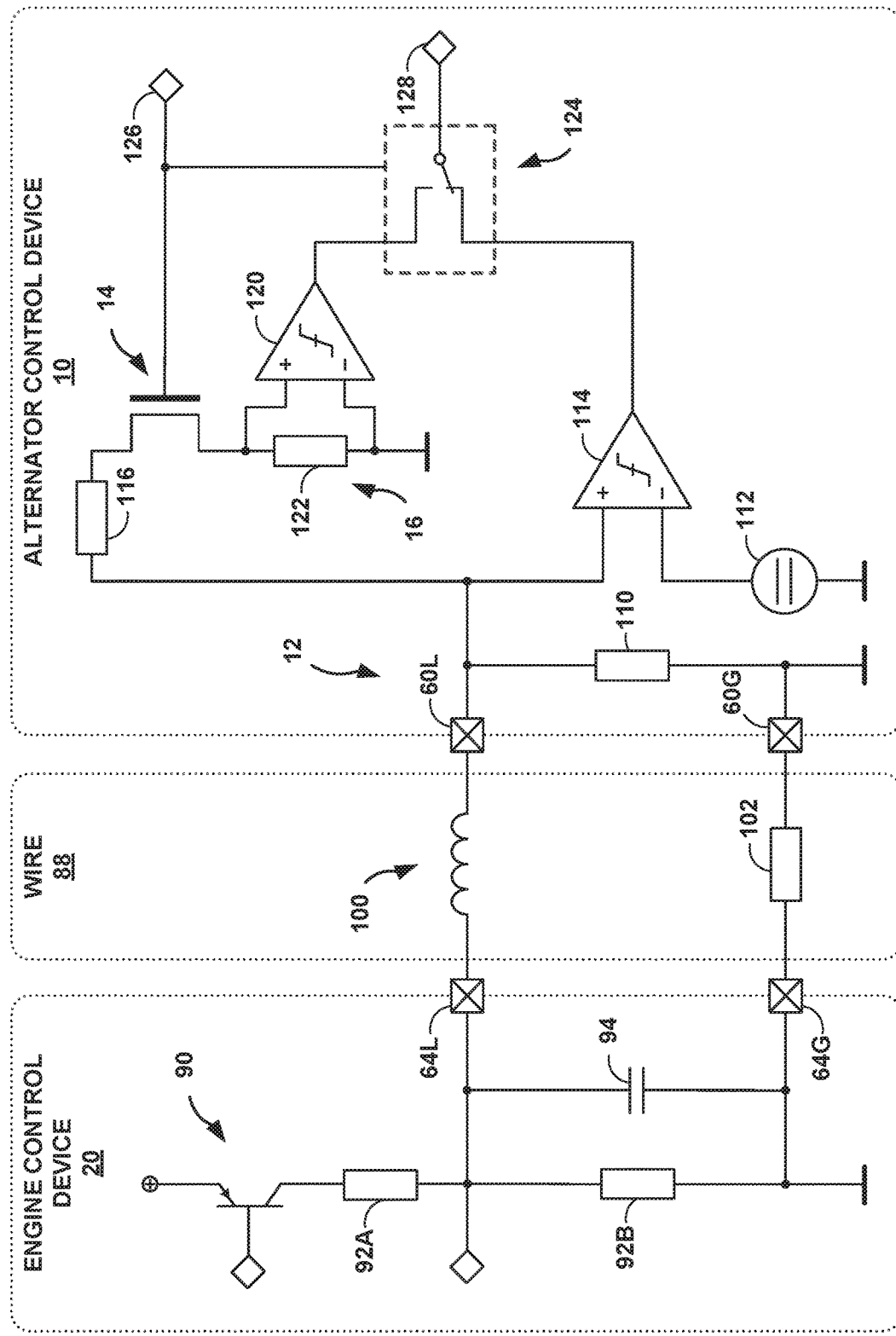
FIG. 4 is a circuit diagram of the alternator control device and the engine control device of FIGS. 1 and 3, in accordance with some examples of this disclosure.

FIG. 4 is a circuit diagram of alternator control device 10 and engine control device 20, in accordance with some examples of this disclosure. In the example of FIG. 4, alternator control device 10 includes passive elements 110, 116, and 122, threshold voltage supply 112, comparator 114, switch 14, pull-down circuitry 16, comparator 120, and switch 124. In the example of FIG. 4, engine control device 20 may include switch 90, passive elements 92A, 92B, and 94. Wire 88 may include passive elements 100 and 102. Passive elements 92A, 92B, 94, 100, 102, 110, 116, and 122 may include resistors, capacitors, and/or inductors. In the example of FIG. 4, each of passive elements 92A, 92B, 102, 110, 116, and 122 may be a resistor, passive element 94 may be a capacitor, and passive element 100 may be an inductor or may represent the inductance of wire 88. In some examples, elements 100 and 102 may represent the characteristics of wire 88, such as parasitic inductance and inherent resistance, instead of discrete components along wire 88.

To transmit a command signal, such as voltage signal 22, to alternator control device 10, engine control device 20 may activate switch 90 to pull up the voltage at communication node 64L. Passive elements 92A and 92B may operate as a voltage divider that outputs voltage signal 22 to communication node 64L. Passive element 94 may operate as a low-pass filter to smooth fluctuations in voltage signal 22.

Wire 88 may include two electrical connections: a first electrical connection between communication nodes 60L and 64L and a second electrical connection between ground nodes 60G and 64G. Communication node 60L may be a part of interface 28 depicted in FIG. 1. The first electrical connection may include passive element 100 that smooths fluctuations in voltage signal 22. The second electrical connection may be the connections of alternator control device 10 and engine control device 20 to a reference-voltage source or sink.

In alternator control device 10, passive element 110 may impede the flow of electricity between 60L and 60G. Comparator 114 may be configured to compare the voltage level of voltage signal 22, i.e., the voltage level at communication node 60L, and the voltage level of threshold voltage supply 112. Processing circuitry 18 may be configured to determine if the voltage level of voltage signal 22 is higher the voltage level of threshold voltage supply 112 by detecting the output of comparator 114 through switch 124 and node 128.

Switch 14 is electrically connected between communication node 60L and pull-down circuitry 16. Switch 14, when activated, is configured to conduct electricity from communication node 60L through passive element 116 to pull-down circuitry 16. Passive elements 116 and 122 may be configured to pull down the voltage level at communication node 60L. The voltage level after the pull-down may still be 1.5 volts, for example, higher than a reference voltage level, which may be approximately equal to the voltage level at ground node 60G. Comparator 120 may be configured to detect the flow of electricity through passive element 122 of pull-down circuitry 16. Processing circuitry 18 may be configured to control the operation of switch 14 through node 126 and to detect the output of comparator 120 through switch 124 and node 128. In some examples, processing circuitry 18 may include none, some, or all of passive elements 110, 116, and 122, threshold voltage supply 112, comparator 114, switch 14, pull-down circuitry 16, comparator 120, and switch 124.

Figure 5:
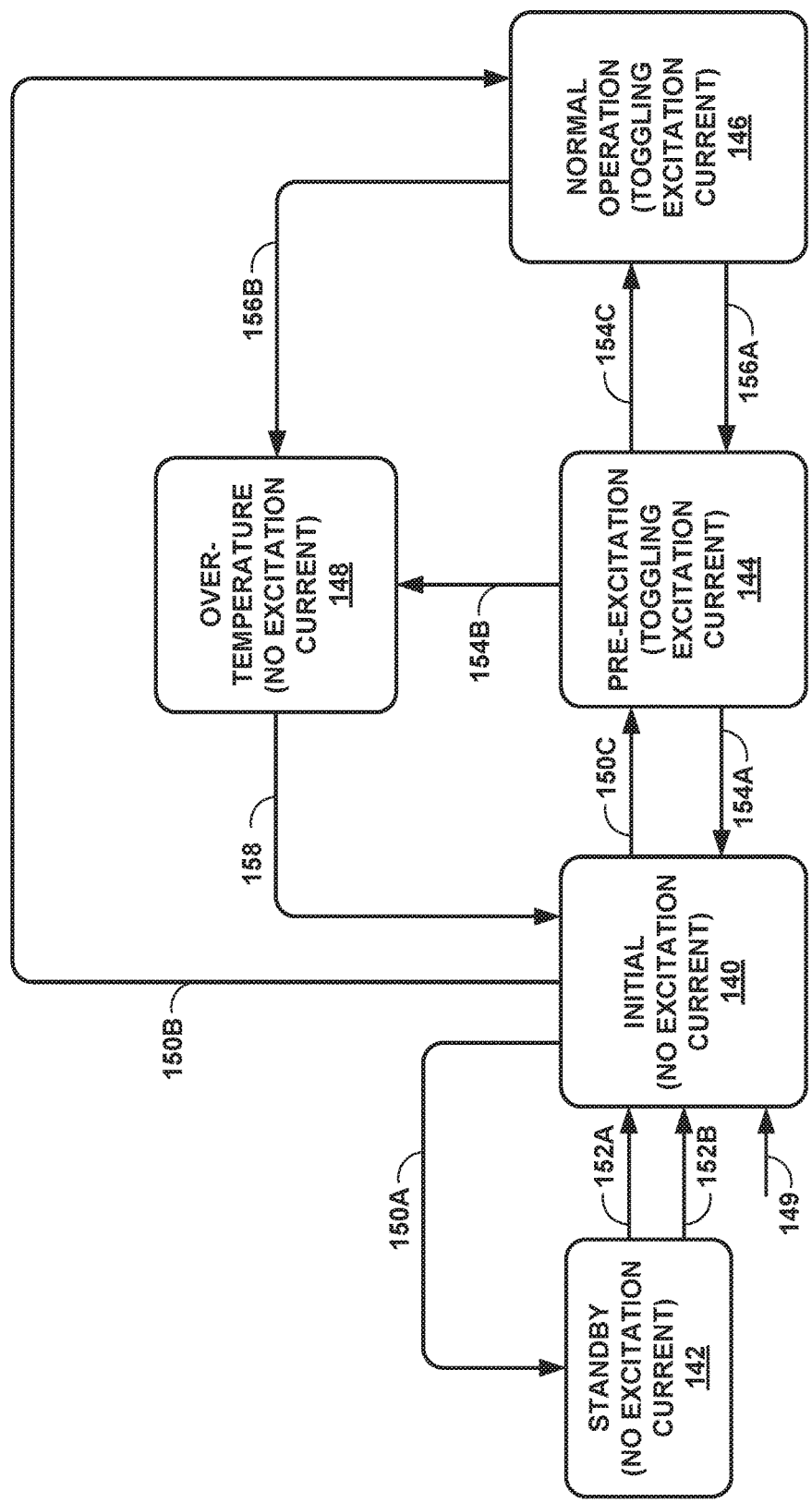
FIG. 5 is a state diagram for the alternator control device of FIGS. 1, 3, and 4, in accordance with some examples of this disclosure.

FIG. 5 is a state diagram for alternator control device 10, in accordance with some examples of this disclosure. In initial state 140, standby state 142, and over-temperature state 148, alternator control device 10 may refrain from causing the delivery of an excitation current to alternator 30. In pre-excitation state 144 and normal operation state 146, alternator control device 10 may refrain from causing the delivery of an excitation current to alternator 30. In initial state 140, pre-excitation state 144, and normal operation state 146, communication circuitry 12 may be ready to receive command signals from engine control device 20. In standby state 142 and over-temperature state 148, communication circuitry 12 may be inactive, such that alternator control device 10 will not process command signals from engine control device 20.

Alternator control device 10 may enter initial state 140 by transition 149 during power up, which may include a voltage higher than two volts. Alternator control device 10 may be configured to enter standby state 142 by transition 150A if no signal is detected at phase node 60P and no deglitched key-on signal is detected. Alternator control device 10 may be configured to enter normal operation state 146 by transition 150B if a restore-state operation is successful. Alternator control device 10 may be configured to enter pre-excitation state 144 by transition 150C if an operation signal is high or a second rotational speed event is active. The second rotational speed event may be active when the speed of the alternator is greater than a threshold speed, such as a self-start speed. Alternator control device 10 may be configured to enter initial state 140 from standby state 142 by transition 152A or 152B if communication circuitry 12 receives a wake-up signal or phase node 60P receives a phase wake up signal.

Alternator control device 10 may be configured to enter initial state 140 from pre-excitation state 144 by transition 154A if the operational signal is low, a second rotational speed event is inactive, and a phase signal is low. Alternator control device 10 may be configured to enter over-temperature state 148 from pre-excitation state 144 by transition 154B if an over-temperature event occurs. Over-temperature state 148 may be a safety state to protect alternator control device 10 from high operating temperatures. Alternator control device 10 may be configured to enter normal operation state 146 from pre-excitation state 144 by transition 154C if a first rotational speed is active.

Alternator control device 10 may be configured to enter pre-excitation state 144 from normal operation state 146 by transition 156A if the second rotational speed is inactive. Alternator control device 10 may be configured to enter over-temperature state 148 from normal operation state 146 by transition 156B if an over-temperature event occurs. Alternator control device 10 may be configured to enter initial state 140 from over-temperature state 148 by transition 158 if an over-temperature event is not occurring.

In some examples, processing circuitry 18 may be configured to transition from initial state 140 to pre-excitation state 144 based on determining that, at least a threshold time duration after activating switch 14, voltage signal 22 is not higher than a threshold voltage level. Processing circuitry 18 may be further configured to refrain from transitioning from initial state 140 to pre-excitation state 144 based on determining that, at least the threshold time duration after activating switch 14, voltage signal 22 is higher than the threshold voltage level.

Processing circuitry 18 may be configured to refrain from transitioning from initial state 140 to pre-excitation state 144 further based on determining that the speed of the alternator is less than a threshold speed. In some examples, when the speed of the alternator is greater than the threshold speed, processing circuitry 18 may be configured to transition initial state 140 to pre-excitation state 144, even if voltage signal 22 is higher than the threshold voltage level at least the threshold time duration after activating switch 14. Thus, processing circuitry 18 may be configured to transition from initial state 140 to pre-excitation state 144 based on determining that voltage signal 22 has been pulled down or that the speed of the alternator is greater than the threshold speed.

FIGS. 6A-6C are timing diagrams for alternator control device 10 and engine control device 20, in accordance with some examples of this disclosure. Timing diagram 170 illustrates an example of the voltage level of voltage signal 22 at interface 28. Voltage level 172 may be the threshold voltage level of threshold voltage supply 112.

At rising edge 174, voltage signal 22 increases to a voltage level that is greater than the threshold voltage level 172. Engine control device 20 may cause the increase in voltage signal 22 by turning on and activating switch 90 to pull up the voltage level at communication nodes 60L and 64L. Timing diagram 180 illustrates the operating state of engine control device 20, where a high value indicates that engine control device 20 is on, and a low value indicates that engine control device 20 is off. At rising edge 182, engine control device 20 activates switch 90 to pull up voltage 22, as shown at rising edge 174.

At rising edge 192, processing circuitry 18 pulls up the voltage level at node 126 to activate switch 14. Timing diagram 190 illustrates the voltage level at node 126. By activating switch 14, processing circuitry 18 pulls down voltage signal 22 at falling edge 175. Time duration 176 is the time period during which the voltage level of voltage signal 22 is greater than threshold voltage level 172. Time duration 176 may be less than a threshold time duration, which may indicate that voltage signal 22 is not pulled up due to an inadvertent short circuit. Based on determining that voltage signal 22 is lower than threshold voltage level 172 at least the threshold time duration after activating switch 14, processing circuitry may be configured to cause the excitation current to be delivered to alternator 30. Voltage signal 22 may subsequently increase at rising edge 178 when the voltage level at node 126 decreases at falling edge 194.

Figure 7:
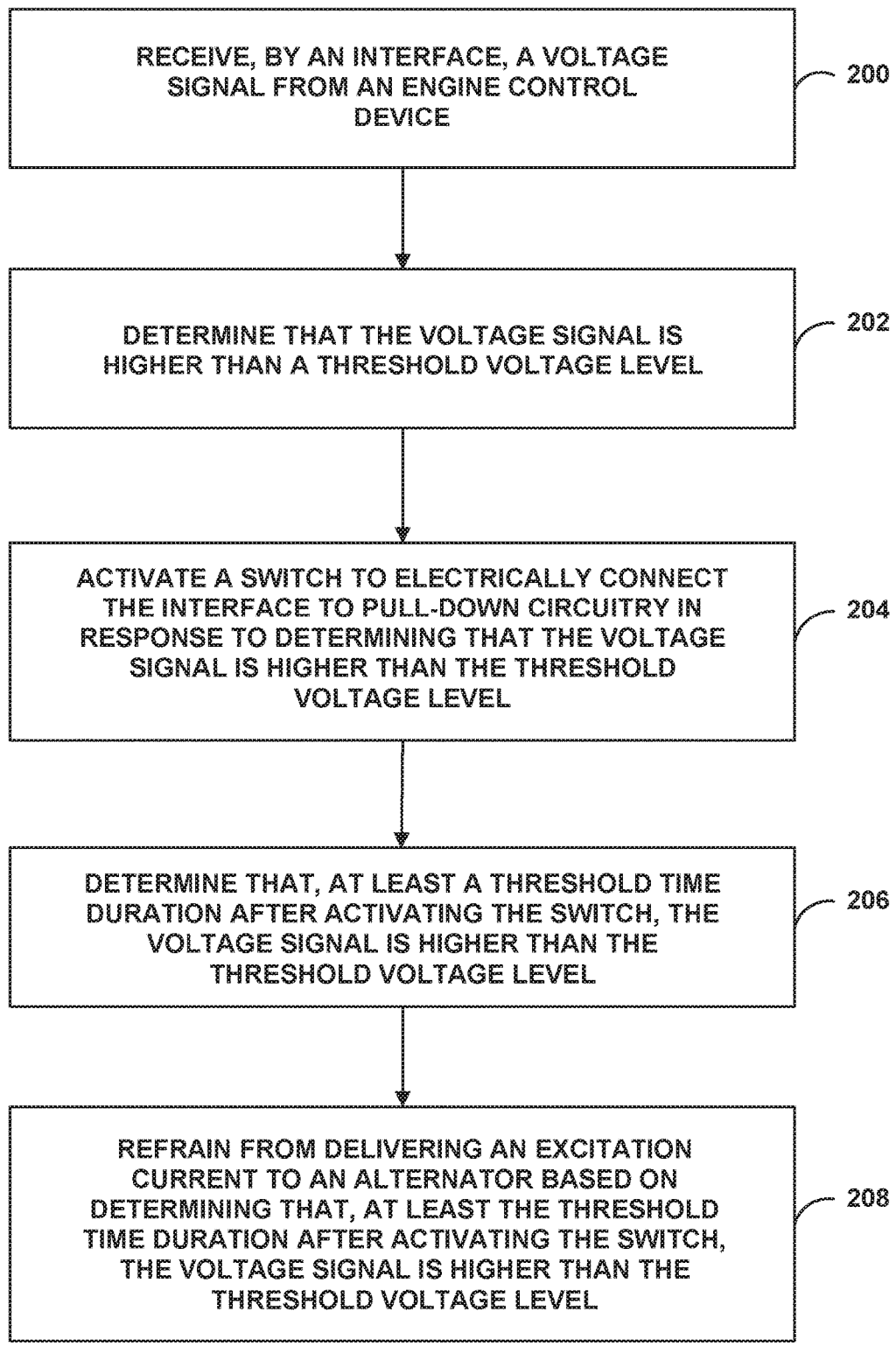
FIG. 7 is a flowchart illustrating a technique for controlling delivery of an excitation current to an alternator, in accordance with some examples of this disclosure.

FIG. 7 is a flowchart illustrating a technique 200 for controlling delivery of an excitation current to an alternator, in accordance with some examples of this disclosure. Technique 200 is described with reference to alternator control device 10 in FIGS. 1, 3, and 4, although other components may exemplify similar techniques.

The technique of FIG. 7 includes receiving, by interface 28, voltage signal 22 from engine control device 20 (200). Engine control device 20 may activate switch 90 to pull up voltage signal 22. Interface 28 may receive voltage signal 22 at communication node 60L, which may include a metal pin soldered to wire 88.

The technique of FIG. 7 also includes determining that voltage signal 22 is higher than a threshold voltage level (202). Processing circuitry 18 may be configured to determine that voltage signal 22 is higher than the voltage level of threshold voltage supply 112 by detecting the output signal of comparator 114 at node 128. Comparator 114 is configured to compare voltage signal 22 to threshold voltage supply 112.

The technique of FIG. 7 further includes activating switch 14 to electrically connect interface 28 and pull-down circuitry 16 in response to determining that voltage signal 22 is higher than the threshold voltage level (204). Processing circuitry 18 may be configured to pull up the voltage at node 126 to activate switch 14 so that electrical charge flows through switch 14 and passive elements 116 and 122.

The technique of FIG. 7 also includes determining that, at least a threshold time duration after activating switch 14, voltage signal 22 is higher than the threshold voltage level (206). Processing circuitry 18 may be configured to set a timer when switch 14 is activated. Processing circuitry 18 may be configured to detect the output of comparator 114 after the timer value reaches or exceeds the threshold time duration. Processing circuitry 18 may be configured to determine that, at least the threshold time duration after activating switch 14 or after setting the timer, voltage signal 22 is higher than the threshold voltage level.

The technique of FIG. 7 also includes refraining from delivering the excitation current to alternator 30 based on determining that, at least the threshold time duration after activating switch 14, voltage signal 22 is higher than the threshold voltage level (208). Processing circuitry 18 may be configured to refrain from delivering enabling control signals to power conversion circuitry including at least one power switch, where the power conversion circuitry is configured to deliver the excitation current to alternator 30. In some examples, processing circuitry 18 may be configured to determine that a rotor of alternator 30 is rotating and to deliver enabling control signals to the at least one power switch based on determining that the rotor is rotating. If the rotor is rotating, delivery of the excitation current may generate electrical power. In some examples, delivery of the excitation current may generate electrical power only if the speed of the rotor is greater than a threshold speed.

The techniques of this disclosure may be implemented in a device or article of manufacture comprising a computer-readable storage medium. The term "processing circuitry," as used herein may refer to any of the foregoing structure or any other structure suitable for processing program code and/or data or otherwise implementing the techniques described herein. Elements of alternator control device 10 and/or processing circuitry 18 may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein. Processing circuitry 18 may also include analog components arranged in a mixed-signal IC.

Alternator control device 10 and/or processing circuitry 18 may include memory. One or more memory devices of the memory may include any volatile or non-volatile media, such as a RAM, ROM, non-volatile RAM (NVRAM), electrically erasable programmable ROM (EEPROM), flash memory, and the like. One or more memory devices of the memory may store computer readable instructions that, when executed by the processing circuitry, cause the processing circuitry to implement the techniques attributed herein to the processing circuitry.

Elements of alternator control device 10 and/or processing circuitry 18 may be programmed with various forms of software. The processing circuitry may be implemented at least in part as, or include, one or more executable applications, application modules, libraries, classes, methods, objects, routines, subroutines, firmware, and/or embedded code, for example. The processing circuitry may be configured to receive voltage signals, determine switching frequencies, and deliver control signals.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

The following numbered examples demonstrate one or more aspects of the disclosure.

Example 1

An alternator control device is configured to control delivery of an excitation current to an alternator, and the alternator control device including interface configured to receive a voltage signal from an engine control device, pull-down circuitry, and a switch electrically connected between the interface and the pull-down circuitry. The alternator control device further includes processing circuitry configured to determine that the voltage signal is higher than a threshold voltage level and to activate the switch to electrically connect the interface to the pull-down circuitry in response to determining that the voltage signal is higher than the threshold voltage level. The processing circuitry is further configured to determine that, at least a threshold time duration after activating the switch, the voltage signal is higher than the threshold voltage level and to refrain from delivering the excitation current to the alternator based on determining that, at least the threshold time duration after activating the switch, the voltage signal is higher than a threshold voltage level.

Example 2

The alternator control device of example 1, wherein the processing circuitry is further configured to determine that, at least the threshold time duration after activating the switch, the voltage signal is higher than the threshold voltage level by at least setting a timer in response to determining that the voltage signal is higher than the threshold voltage level and determining that a value of the timer is greater than or equal to the threshold time duration. The processing circuitry is further configured to determine that, at least the threshold time duration after activating the switch, the voltage signal is higher than the threshold voltage level in response to determining that the value of the timer is greater than or equal to the threshold time duration.

Example 3

The alternator control device of examples 1-2 or any combination thereof, wherein the processing circuitry includes a comparator configured to compare the voltage signal and the threshold voltage level, and wherein the processing circuitry is configured to determine that the voltage signal is higher than the threshold voltage level by at least detecting an output of the comparator.

Example 4

The alternator control device of examples 1-3 or any combination thereof, wherein the processing circuitry is configured to refrain from delivering the excitation current by at least refraining from delivering enabling control signals to at least one power switch, wherein the at least one power switch is configured to conduct the excitation current from power supply circuitry to a rotor of the alternator. The processing circuitry is further configured to determine that the alternator is rotating and deliver enabling control signals to the at least one power switch based on determining that the alternator is rotating.

Example 5

The alternator control device of examples 1-4 or any combination thereof, wherein the processing circuitry includes a state machine including a first state and a second state, wherein the processing circuitry is configured to refrain from delivering the excitation current in the first state, and wherein the processing circuitry is configured to deliver the excitation current in the second state. The processing circuitry is further configured to transition from the first state to the second state based on determining that, at least the threshold time duration after activating the switch, the voltage signal is not higher than the threshold voltage level and refrain from transitioning from the first state to the second state based on determining that, at least the threshold time duration after activating the switch, voltage signal is higher than the threshold voltage level.

Example 6

The alternator control device of examples 1-5 or any combination thereof, wherein the processing circuitry is further configured to determine that, at least the threshold time duration after activating the switch, the voltage signal is lower than the threshold voltage level and cause the excitation current to be delivered to the alternator based on determining that, at least the threshold time duration after activating the switch, the voltage signal is lower than the threshold voltage level.

Example 7

The alternator control device of examples 1-6 or any combination thereof, wherein the interface includes a pin configured to receive the voltage signal from an engine control device, and wherein the pull-down circuitry includes a pull-down resistor electrically connected to the switch wherein the pull-down resistor is configured to pull down the voltage signal to a reference voltage.

Example 8

The alternator control device of examples 1-7 or any combination thereof, wherein the processing circuitry includes reference voltage circuitry, wherein the pull-down circuitry is electrically connected between the switch and the reference voltage circuitry. The processing circuitry is further configured to de-activate the switch based on determining that, at least the threshold time duration after activating the switch, the voltage signal is higher than the threshold voltage level. The processing circuitry is also configured to re-activate the switch after a delay time duration and determine that, at least the threshold time duration after re-activating the switch, the voltage signal is higher than the threshold voltage level and refrain from delivering the excitation current to the alternator based on determining that, at least the threshold time duration after re-activating the switch, the voltage signal is higher than the threshold voltage level.

Example 9

The alternator control device of examples 1-8 or any combination thereof 8, wherein the threshold time duration is greater than twenty microseconds and less than one hundred microseconds, and wherein the delay time duration is greater than ten milliseconds and less than one hundred milliseconds.

Example 10

A method for controlling delivery of an excitation current to an alternator, the method including receiving, by an interface, a voltage signal from an engine control device and determining that the voltage signal is higher than a threshold voltage level. The method further includes activating a switch to electrically connect the interface to pull-down circuitry in response to determining that the voltage signal is higher than the threshold voltage level. The method also includes determining that, at least a threshold time duration after activating the switch, the voltage signal is higher than the threshold voltage level. The method includes refraining from delivering the excitation current to the alternator based on determining that, at least the threshold time duration after activating the switch, the voltage signal is higher than the threshold voltage level.

Example 11

The method of example 10, wherein determining that, at least the threshold time duration after activating the switch, the voltage signal is higher than the threshold voltage level includes setting a timer in response to determining that the voltage signal is higher than the threshold voltage level and determining that a value of the timer is greater than or equal to the threshold time duration. The method further includes determining that, at least the threshold time duration after activating the switch, the voltage signal is higher than the threshold voltage level in response to determining that the value of the timer is greater than or equal to the threshold time duration.

Example 12

The method of examples 10-11 or any combination thereof, further including comparing the voltage signal and the threshold voltage level, wherein determining that the voltage signal is higher than the threshold voltage level is based on comparing the voltage signal and the threshold voltage level.

Example 13

The method of examples 10-12 or any combination thereof, further including transitioning from a first state to a second state based on determining that, at least the threshold time duration after activating the switch, the voltage signal is not higher than the threshold voltage level; and refraining from transitioning from the first state to the second state based on determining that, at least the threshold time duration after activating the switch, voltage signal is higher than the threshold voltage level, wherein the first state includes refraining from delivering the excitation current to the alternator, and wherein the second state includes delivering the excitation current to the alternator.

Example 14

The method of examples 10-13 or any combination thereof, further including de-activate the switch based on determining that, at least the threshold time duration after activating the switch, the voltage signal is higher than the threshold voltage level and re-activating the switch after a delay time duration. The method further includes determining that, at least the threshold time duration after re-activating the switch, the voltage signal is higher than the threshold voltage level; and refraining from delivering the excitation current to the alternator based on determining that, at least the threshold time duration after re-activating the switch, the voltage signal is higher than the threshold voltage level.

Example 15

The method of examples 10-14 or any combination thereof, wherein the threshold time duration is greater than twenty microseconds and less than one hundred microseconds, and wherein the delay time duration is greater than ten milliseconds and less than one hundred milliseconds.

Example 16

An alternator for a vehicle includes a rotor including one or more rotor coils, a stator including one or more stator coils, and an alternator control device configured to control an excitation current delivered to the one or more rotor coils, wherein the alternator control device includes a pin configured to receive a voltage signal from an engine control device. The alternator control device further includes pull-down circuitry, a switch electrically connected between the pin and the pull-down circuitry, and processing circuitry configured to determine that the voltage signal is higher than a threshold voltage level. The processing circuitry is further configured to activate the switch to electrically connect the pin to the pull-down circuitry in response to determining that the voltage signal is higher than the threshold voltage level. The processing circuitry is further configured to determine that, at least a threshold time duration after activating the switch, the voltage signal is higher than the threshold voltage level and to refrain from delivering the excitation current to the one or more rotor coils based on determining that, at least the threshold time duration after activating the switch, the voltage signal is higher than the threshold voltage level.

Example 17

The alternator of example 16, wherein the processing circuitry includes a comparator configured to compare the voltage signal and the threshold voltage level, and wherein the processing circuitry is configured to determine that the voltage signal is higher than the threshold voltage level by at least detecting an output of the comparator. The processing circuitry is configured to determine that, at least the threshold time duration after activating the switch, the voltage signal is higher than the threshold voltage level by at least setting a timer in response to determining that the voltage signal is higher than the threshold voltage level and determining that a value of the timer is greater than or equal to the threshold time duration.

Example 18

The alternator of examples 16-17 or any combination thereof, further including power supply circuitry and power conversion circuitry configured to conduct electricity from the power supply circuitry to the one or more rotor coils. The processing circuitry is configured to refrain from delivering the excitation current by at least refraining from delivering enabling control signals to the power conversion circuitry to cause the power conversion circuitry to refrain from conducting electricity from the power supply circuitry to the one or more rotor coils.

Example 19

The alternator of examples 16-18 or any combination thereof, wherein the processing circuitry includes a state machine including a first state and a second state, and wherein the processing circuitry is configured to refrain from delivering the excitation current in the first state. The processing circuitry is configured to deliver the excitation current in the second state, and the processing circuitry is further configured to transition from the first state to the second state based on determining that, at least the threshold time duration after activating the switch, the voltage signal is not higher than the threshold voltage level. The processing circuitry is also configured to refrain from transitioning from the first state to the second state based on determining that, at least the threshold time duration after activating the switch, the voltage signal is higher than the threshold voltage level.

Example 20

The alternator of examples 16-19 or any combination thereof, wherein the processing circuitry is further configured to de-activate the switch based on determining that, at least the threshold time duration after activating the switch, the voltage signal is higher than the threshold voltage level. The processing circuitry is also configured to re-activate the switch after a delay time duration, determine that, at least the threshold time duration after re-activating the switch, the voltage signal is higher than the threshold voltage level, and refrain from delivering the excitation current to the alternator based on determining that, at least the threshold time duration after re-activating the switch, the voltage signal is higher than the threshold voltage level.

Example 21

The alternator of examples 16-20 or any combination thereof, further including power conversion circuitry configured to conduct the excitation current to the one or more rotor coils.

Example 22

A vehicle including an engine configured to generate mechanical power, an engine control device configured to control operation of the engine, an alternator configured to generate electrical power based on the mechanical power generated by the engine and based on an excitation current, wherein the alternator includes a rotor including one or more rotor coils, a stator including one or more stator coils, and an alternator control device configured to control the excitation current delivered to the one or more rotor coils, wherein the alternator control device includes a pin configured to receive a voltage signal from the engine control device. The alternator control device further includes pull-down circuitry, a switch electrically connected between the pin and the pull-down circuitry, and processing circuitry configured to determine that the voltage signal is higher than a threshold voltage level. The processing circuitry is further configured to activate the switch to electrically connect the pin to the pull-down circuitry in response to determining that the voltage signal is higher than the threshold voltage level. The processing circuitry is further configured to determine that, at least a threshold time duration after activating the switch, the voltage signal is higher than the threshold voltage level and to refrain from delivering the excitation current to the one or more rotor coils based on determining that, at least the threshold time duration after activating the switch, the voltage signal is higher than the threshold voltage level.

Various examples of the disclosure have been described. Any combination of the described systems, operations, or functions is contemplated. These and other examples are within the scope of the following claims.

What is claimed is:

1. An alternator control device configured to control delivery of an excitation current to an alternator, the alternator control device comprising:
an interface configured to receive a voltage signal from an engine control device;

pull-down circuitry;
a switch electrically connected between the interface and the pull-down circuitry; and
processing circuitry configured to:
   determine that the voltage signal is higher than a threshold voltage level;
   activate the switch to electrically connect the interface to the pull-down circuitry in response to determining that the voltage signal is higher than the threshold voltage level;
   determine that, at least a threshold time duration after activating the switch, the voltage signal is higher than the threshold voltage level; and
   refrain from delivering the excitation current to the alternator based on determining that, at least the threshold time duration after activating the switch, the voltage signal is higher than the threshold voltage level.

2. The alternator control device of claim 1, wherein the processing circuitry is further configured to determine that, at least the threshold time duration after activating the switch, the voltage signal is higher than the threshold voltage level by at least:
   setting a timer in response to determining that the voltage signal is higher than the threshold voltage level; and
   determining that a value of the timer is greater than or equal to the threshold time duration,
   wherein the processing circuitry is further configured to determine that, at least the threshold time duration after activating the switch, the voltage signal is higher than the threshold voltage level in response to determining that the value of the timer is greater than or equal to the threshold time duration.

3. The alternator control device of claim 1,
   wherein the processing circuitry includes a comparator configured to compare the voltage signal and the threshold voltage level, and
   wherein the processing circuitry is configured to determine that the voltage signal is higher than the threshold voltage level by at least detecting an output of the comparator.

4. The alternator control device of claim 1,
   wherein the processing circuitry is configured to refrain from delivering the excitation current by at least refraining from delivering enabling control signals to at least one power switch,
   wherein the at least one power switch is configured to conduct the excitation current from power supply circuitry to a rotor of the alternator, and
   wherein the processing circuitry is further configured to:
      determine that the alternator is rotating; and
      deliver enabling control signals to the at least one power switch based on determining that the alternator is rotating.

5. The alternator control device of claim 1,
   wherein the processing circuitry comprises a state machine including a first state and a second state;
   wherein the processing circuitry is configured to refrain from delivering the excitation current in the first state;
   wherein the processing circuitry is configured to deliver the excitation current in the second state; and
   wherein the processing circuitry is further configured to:
      transition from the first state to the second state based on determining that, at least the threshold time duration after activating the switch, the voltage signal is not higher than the threshold voltage level; and
      refrain from transitioning from the first state to the second state based on determining that, at least the threshold time duration after activating the switch, voltage signal is higher than the threshold voltage level.

6. The alternator control device of claim 1, wherein the processing circuitry is further configured to:
   determine that, at least the threshold time duration after activating the switch, the voltage signal is lower than the threshold voltage level; and
   cause the excitation current to be delivered to the alternator based on determining that, at least the threshold time duration after activating the switch, the voltage signal is lower than the threshold voltage level.

7. The alternator control device of claim 1, wherein the interface comprises a pin configured to receive the voltage signal from an engine control device, and wherein the pull-down circuitry comprises a pull-down resistor electrically connected to the switch wherein the pull-down resistor is configured to pull down the voltage signal to a reference voltage.

8. The alternator control device of claim 1, wherein the processing circuitry comprises:
   reference voltage circuitry, wherein the pull-down circuitry is electrically connected between the switch and the reference voltage circuitry; and
   wherein the processing circuitry is further configured to:
      de-activate the switch based on determining that, at least the threshold time duration after activating the switch, the voltage signal is higher than the threshold voltage level;
      re-activate the switch after a delay time duration;
      determine that, at least the threshold time duration after re-activating the switch, the voltage signal is higher than the threshold voltage level and
      refrain from delivering the excitation current to the alternator based on determining that, at least the threshold time duration after re-activating the switch, the voltage signal is higher than the threshold voltage level.

9. The alternator control device of claim 8, wherein the threshold time duration is greater than twenty microseconds and less than one hundred microseconds, and wherein the delay time duration is greater than ten milliseconds and less than one hundred milliseconds.

10. A method for controlling delivery of an excitation current to an alternator, the method comprising:
   receiving, by an interface, a voltage signal from an engine control device;
   determining that the voltage signal is higher than a threshold voltage level;
   activating a switch to electrically connect the interface to pull-down circuitry in response to determining that the voltage signal is higher than the threshold voltage level;
   determining that, at least a threshold time duration after activating the switch, the voltage signal is higher than the threshold voltage level; and
   refraining from delivering the excitation current to the alternator based on determining that, at least the threshold time duration after activating the switch, the voltage signal is higher than the threshold voltage level.

11. The method of claim 10, wherein determining that, at least the threshold time duration after activating the switch, the voltage signal is higher than the threshold voltage level comprises:
   setting a timer in response to determining that the voltage signal is higher than the threshold voltage level; and determining that a value of the timer is greater than or equal to the threshold time duration, the method further comprising determining that, at least the threshold time duration after activating the switch, the voltage signal is higher than the threshold voltage level in response to determining that the value of the timer is greater than or equal to the threshold time duration.

12. The method of claim 11, further comprising comparing the voltage signal and the threshold voltage level, wherein determining that the voltage signal is higher than the threshold voltage level is based on comparing the voltage signal and the threshold voltage level.

13. The method of claim 10, further comprising:

transitioning from a first state to a second state based on determining that, at least the threshold time duration after activating the switch, the voltage signal is not higher than the threshold voltage level; and refraining from transitioning from the first state to the second state based on determining that, at least the threshold time duration after activating the switch, voltage signal is higher than the threshold voltage level, wherein the first state includes refraining from delivering the excitation current to the alternator, and wherein the second state includes delivering the excitation current to the alternator.

14. The method of claim 10, further comprising:

de-activate the switch based on determining that, at least the threshold time duration after activating the switch, the voltage signal is higher than the threshold voltage level;

re-activating the switch after a delay time duration;

determining that, at least the threshold time duration after re-activating the switch, the voltage signal is higher than the threshold voltage level; and refraining from delivering the excitation current to the alternator based on determining that, at least the threshold time duration after re-activating the switch, the voltage signal is higher than the threshold voltage level.

15. The method of claim 14, wherein the threshold time duration is greater than twenty microseconds and less than one hundred microseconds, and wherein the delay time duration is greater than ten milliseconds and less than one hundred milliseconds.

16. An alternator for a vehicle, the alternator comprising:
a rotor including one or more rotor coils;
a stator including one or more stator coils; and
an alternator control device configured to control an excitation current delivered to the one or more rotor coils, wherein the alternator control device comprises:
  a pin configured to receive a voltage signal from an engine control device;
  pull-down circuitry;
  a switch electrically connected between the pin and the pull-down circuitry; and
  processing circuitry configured to:
    determine that the voltage signal is higher than a threshold voltage level;
    activate the switch to electrically connect the pin to the pull-down circuitry in response to determining that the voltage signal is higher than the threshold voltage level;
    determine that, at least a threshold time duration after activating the switch, the voltage signal is higher than the threshold voltage level; and
    refrain from delivering the excitation current to the one or more rotor coils based on determining that, at least the threshold time duration after activating the switch, the voltage signal is higher than the threshold voltage level.

17. The alternator of claim 16, wherein the processing circuitry includes a comparator configured to compare the voltage signal and the threshold voltage level, wherein the processing circuitry is configured to determine that the voltage signal is higher than the threshold voltage level by at least detecting an output of the comparator; and wherein the processing circuitry is configured to determine that, at least the threshold time duration after activating the switch, the voltage signal is higher than the threshold voltage level by at least:
  setting a timer in response to determining that the voltage signal is higher than the threshold voltage level; and
  determining that a value of the timer is greater than or equal to the threshold time duration.

18. The alternator of claim 16, further comprising:
power supply circuitry; and
power conversion circuitry configured to conduct electricity from the power supply circuitry to the one or more rotor coils,
wherein the processing circuitry is configured to refrain from delivering the excitation current by at least refraining from delivering enabling control signals to the power conversion circuitry to cause the power conversion circuitry to refrain from conducting electricity from the power supply circuitry to the one or more rotor coils.

19. The alternator of claim 17,
wherein the processing circuitry comprises a state machine including a first state and a second state;
wherein the processing circuitry is configured to refrain from delivering the excitation current in the first state;
wherein the processing circuitry is configured to deliver the excitation current in the second state; and
wherein the processing circuitry is further configured to:
  transition from the first state to the second state based on determining that, at least the threshold time duration after activating the switch, the voltage signal is not higher than the threshold voltage level; and
  refrain from transitioning from the first state to the second state based on determining that, at least the threshold time duration after activating the switch, the voltage signal is higher than the threshold voltage level.

20. The alternator of claim 16, wherein the processing circuitry is further configured to:
de-activate the switch based on determining that, at least the threshold time duration after activating the switch, the voltage signal is higher than the threshold voltage level;
re-activate the switch after a delay time duration;
determine that, at least the threshold time duration after re-activating the switch, the voltage signal is higher than the threshold voltage level; and
refrain from delivering the excitation current to the alternator based on determining that, at least the threshold time duration after re-activating the switch, the voltage signal is higher than the threshold voltage level.

* * * * *